United States Patent
Font Freide

(10) Patent No.: US 7,005,456 B2
(45) Date of Patent: Feb. 28, 2006

(54) FISCHER-TROPSCH PROCESS

(75) Inventor: Josephus Johannes Helena Maria Font Freide, Guildford (GB)

(73) Assignees: BP Exploration Operating Company Limited, London (GB); Davy Process Technology Limited, London (GB)

( * ) Notice: Subject to any disclaimer, the term of this patent is extended or adjusted under 35 U.S.C. 154(b) by 117 days.

(21) Appl. No.: 10/476,613

(22) PCT Filed: May 17, 2002

(86) PCT No.: PCT/GB02/02267

§ 371 (c)(1),
(2), (4) Date: Dec. 17, 2003

(87) PCT Pub. No.: WO02/096834

PCT Pub. Date: Dec. 5, 2002

(65) Prior Publication Data

US 2004/0147623 A1    Jul. 29, 2004

(30) Foreign Application Priority Data

May 25, 2001    (GB)    .................................... 0112801

(51) Int. Cl.
*C07C 27/00*    (2006.01)
(52) U.S. Cl. ........................ 518/700; 518/705; 518/715
(58) Field of Classification Search ................. 518/700, 518/705, 715
See application file for complete search history.

(56) References Cited

U.S. PATENT DOCUMENTS 6,512,017 B1 *    1/2003    Steynberg et al. ........... 518/712

FOREIGN PATENT DOCUMENTS

GB    728543    4/1955
WO    WO 01/38269 A1    5/2001

* cited by examiner

*Primary Examiner*—J. Parsa
(74) *Attorney, Agent, or Firm*—Nixon & Vanderhye

(57) ABSTRACT

A method of starting up a Fischer-Tropsch reaction in a system comprising at least one high shear mixing zone and a reactor vessel which method comprises a) passing a suspension of a particulate Fischer-Tropsch catalyst in a liquid medium through the high shear mixing zone(s) into the reactor vessel and recycling at least a portion of the suspension to the high shear mixing zone(s) in the substantial absence of a gaseous reactant feed stream comprising synthesis gas; b) increasing the temperature and/or pressure within the reactor vessel until a threshold temperature and/or pressure is reached and subsequently introducing a gaseous reactant stream comprising synthesis gas into the high shear mixing zone(s) where the gaseous reactant stream is mixed with the suspension; c) discharging a mixture comprising synthesis gas and the suspension from the high shear mixing zone(s) into the reactor vessel; d) converting the synthesis gas to liquid hydrocarbons in the reactor vessel to form a product suspension comprising the particulate Fischer-Tropsch catalyst suspended in the liquid medium and liquid hydrocarbons; and e) recycling at least a portion of the product suspension to the high shear mixing zone(s).

17 Claims, 1 Drawing Sheet

FISCHER-TROPSCH PROCESS

This application is the U.S. National Phase of International Application PCT/GB02/02267, filed May 17, 2002, which designated the U.S.

The present invention relates to a method of operating a process for the conversion of carbon monoxide and hydrogen (synthesis gas) to liquid hydrocarbon products in the presence of a particulate catalyst.

BACKGROUND OF THE INVENTION

In the Fischer-Tropsch reaction synthesis gas is reacted in the presence of a catalyst to give a hydrocarbon mixture having a relatively broad molecular weight distribution. This product comprises predominantly straight chain saturated hydrocarbons which typically have a chain length of more than 5 carbon atoms. The reaction is highly exothermic and therefore heat removal is one of the primary constraints of all Fischer-Tropsch processes. This has directed commercial processes away from fixed bed operation to slurry systems. Such slurry systems employ a suspension of catalyst particles in a liquid medium thereby allowing both the gross temperature control and the local temperature control (in the vicinity of individual catalyst particles) to be significantly improved compared with fixed bed operation.

Fischer-Tropsch processes are known which employ slurry bubble columns in which the catalyst is primarily distributed and suspended in the slurry by the energy imparted from the synthesis gas rising from the gas distribution means at the bottom of the slurry bubble column as described in, for example, U.S. Pat. No. 5,252,613.

However the above processes require a synthesis gas stream to be continuously fed to the slurry when the catalyst is at elevated temperatures and pressures. This ensures that the catalyst is adequately agitated, avoids agglomeration of the catalyst and prevents the catalyst from settling to the bottom of the reactor. Any agglomeration or settling allows hot spots to develop within the catalyst which results in sintering and/or localized polymer formation which deactivate the catalyst. Consequently, when the Fischer-Tropsch process is initiated the synthesis gas reactant stream is used to agitate the catalyst as the temperature rises to the desired reaction temperature and subsequently when the Fischer-Tropsch process is shut down the catalyst is allowed to cool whilst a flow of the synthesis reactant gas stream is maintained thereby maintaining the level of agitation.

It has recently been found that a Fischer-Tropsch process may be operated by contacting synthesis gas with a suspension of a catalyst in a liquid medium in a system comprising at least one high shear mixing zone and a reactor vessel where suspension comprising the particulate Fischer-Tropsch catalyst suspended in liquid hydrocarbons is recycled back to the high shear mixing zone(s). This process is described in WO 0138269 (PCT patent application number GB 0004444) which is herein incorporated by reference.

SUMMARY OF THE INVENTION

It has now been found that by virtue of the high shear mixing zone(s) and the recycle of the product suspension, sufficient agitation is provided in said process to prevent agglomeration and settling of the catalyst in the absence of a synthesis gas reactant stream. Consequently this allows for improved "start-up" and "shut-down" procedures which thereby further improves the efficiency of the process.

Accordingly the present invention provides a method of starting up a Fischer-Tropsch reaction in a system comprising at least one high shear mixing zone and a reactor vessel which method comprises a) passing a suspension of a particulate Fischer-Tropsch catalyst in a liquid medium through the high shear mixing zone(s) into the reactor vessel and recycling at least a portion of the suspension to the high shear mixing zone(s) in the substantial absence of a gaseous reactant feed stream comprising synthesis gas;

b) increasing the temperature and/or pressure within the reactor vessel until a threshold temperature and/or pressure is reached and subsequently introducing a gaseous reactant stream comprising synthesis gas into the high shear mixing zone(s) where the gaseous reactant stream is mixed with the suspension;

c) discharging a mixture comprising synthesis gas and the suspension from the high shear mixing zone(s) into the reactor vessel;

d) converting the synthesis gas to liquid hydrocarbons in the reactor vessel to form a product suspension comprising the particulate Fischer-Tropsh catalyst suspended in the liquid medium and liquid hydrocarbons; and e) recycling at least a portion of the product suspension to the high shear mixing zone(s).

Preferably the suspension of a particulate Fischer-Tropsch catalyst in a liquid medium of step (a) and the product suspension of step (b) are recycled using a mechanical pumping means e.g. a slurry pump.

In step (a) the suspension is preferably recycled around the system in an atmosphere that does not oxidize or deactivate the catalyst. The atmosphere may comprise an inert gas e.g. nitrogen but advantageously comprises a reducing gas e.g. hydrogen and/or carbon monoxide. However, where the reducing atmosphere comprises hydrogen and carbon monoxide (synthesis gas), the synthesis gas is not continuously introduced to the system.

In this "start-up" procedure the temperature in the reactor vessel is usually increased to a threshold temperature in the range of 180–280° C., more preferably 190–240° C. Preferably the pressure in the reactor vessel is usually increased to a threshold pressure of 5–50 bar, more preferably 15–35 bar, generally 20–30 bar.

The present invention further provides a method of shutting down a Fischer-Tropsch reaction in a system comprising at least one high shear mixing zone and a reactor vessel which method comprises a) maintaining a recycle of at least a portion of the product suspension from the reactor vessel to the high shear mixing zone(s); and b) ceasing introducing the gaseous reactant stream comprising synthesis into the high shear mixing zone(s).

Preferably the product suspension in step (a) is recycled using a mechanical pumping means e.g. a slurry pump.

In this "shut down" procedure it is envisaged that in step (b), the rate at which the gaseous reactant stream is introduced to the high shear mixing zones may be gradually reduced to zero.

In this "shut-down" procedure the temperature and pressure in the reactor vessel is usually reduced to ambient temperature and pressure.

When operating a Fischer-Tropsch synthesis process in the system of the present invention, it may be possible to introduce additional synthesis gas to the system outside of the high shear mixing zone(s), for example directly into the reactor vessel and/or into a suspension recycle stream. For avoidance of doubt, in the "shut down" procedure, the supply of any synthesis gas to the system outside of the high shear mixing zone(s) is also ceased.

In yet a further embodiment of the present invention there is provided a method for maintaining a Fischer-Tropsch catalyst in suspension in a liquid medium and liquid hydrocarbon products in a system comprising at least one high shear mixing zone and a reactor vessel which method comprises:

a) maintaining a recycle of at least a portion of the product suspension from the reactor vessel to the high shear mixing zone(s); and
b) reducing the rate at which the gaseous reactant stream comprising synthesis gas is introduced to the high shear mixing zone(s) or interrupting the feed of the gaseous reactant stream comprising synthesis into the high shear mixing zone(s).

Preferably the product suspension in step (a) is recycled using a mechanical pumping means e.g. a slurry pump.

The reactor vessel may be a tank reactor or a tubular loop reactor.

The high shear mixing zone(s) may be part of the reactor system inside or outside the reactor vessel, for example, the high shear mixing zone(s) may project through the walls of the reactor vessel such that the high shear mixing zone(s) discharges its contents into the reactor vessel. Preferably, the reactor system comprises up to 250 high shear mixing zones, more preferably less than 100, most preferably less than 50, for example 10 to 50 high shear mixing zones. Preferably, the high shear mixing zones discharge into or are located within a single reactor vessel as described in WO 0138269 (PCT patent application number GB 0004444). It is also envisaged that 2 or 3 such reactor systems may be employed in series.

Suitably, the volume of suspension present in the high shear mixing zone(s) is substantially less than the volume of suspension present in the reactor vessel, for example, less than 20%, preferably less than 10% of the volume of suspension present in the reactor vessel.

The high shear mixing zone(s) may comprise any device suitable for intensive mixing or dispersing of a gaseous stream in a suspension of solids in a liquid medium, for example, a rotor-stator device, an injector-mixing nozzle or a high shear pumping means, but is preferably an injector mixing nozzle(s). Suitably, the device is capable of breaking down the gaseous stream into gas bubbles and/or irregularly shaped gas voids.

The kinetic energy dissipation rate in the high shear mixing zone(s) is suitably, at least 0.5 kW/m$^3$ relative to the total volume of suspension present in the system, preferably in the range 0.5 to 25 kW/m$^3$, more preferably 0.5 to 10 kW/m$^3$, most preferably 0.5 to 5 kW/m$^3$, and in particular, 0.5 to 2.5 kW/m$^3$ relative to the total volume of suspension present in the system.

Where the high shear mixing zone(s) comprise an injector mixing nozzle(s) the injector-mixing nozzle(s) can advantageously be executed as a venturi tube (c.f. "Chemical Engineers' Handbook" by J. H. Perry, 3$^{rd}$ edition (1953), p. 1285, FIG. 61), preferably an injector mixer (c.f. "Chemical Engineers' Handbook" by J H Perry, 3$^{rd}$ edition (1953), p 1203, FIG. 2 and "Chemical Engineers' Handbook" by R H Perry and C H Chilton 5$^{th}$ edition (1973) p 6–15, FIG. 6–31) or most preferably as a liquid-jet ejector (c.f. "Unit Operations" by G G Brown et al, 4$^{th}$ edition (1953), p. 194, FIG. 210). The injector mixing nozzle(s) may also be executed as a venturi plate positioned within an open ended conduit which discharges the mixture of synthesis gas and suspension into a tank reactor. Alternatively the venturi plate may be positioned within a tubular loop reactor. Suitably, synthesis gas is introduced into the open-ended conduit or tubular loop reactor downstream of the venturi plate. The injector-mixing nozzle(s) may also be executed as "gas blast" or "gas assist" nozzles where gas expansion is used to drive the nozzle (c.f. "Atomisation and Sprays" by Arthur H. Lefebvre, Hemisphere Publishing Corporation, 1989). Where the injector-mixing nozzle(s) is executed as a "gas blast" or "gas assist" nozzle, the suspension of catalyst is fed to the nozzle at a sufficiently high pressure to allow the suspension to pass through the nozzle while the gaseous reactant stream is fed to the nozzle at a sufficiently high pressure to achieve high shear mixing within the nozzle.

The high shear mixing zone(s) may also comprise a high shear pumping means, for example, a paddle or propeller having high shear blades positioned within an open ended pipe which discharges the mixture of synthesis gas and suspension into the reactor vessel. Preferably, the high shear pumping means is located at or near the open end of the pipe, for example, within 1 meter preferably within 0.5 meters of the open end of the pipe. Alternatively, the high shear pumping means may be positioned within a tubular loop reactor vessel. Synthesis gas may be injected into the pipe or tubular loop reactor vessel, for example, via a sparger, located immediately upstream or downstream, preferably upstream of the high shear pumping means, for example, preferably, within 1 meter, preferably within 0.5 meter of the high shear pumping means. Without wishing to be bound by any theory, the injected synthesis gas is broken down into gas bubbles and/or irregularly shaped gas voids by the fluid shear imparted to the suspension by the high shear pumping means.

Where the injector mixing nozzle(s) is executed as a venturi nozzle(s) (either a conventional venturi nozzle or as a venturi plate), the pressure drop of the suspension over the venturi nozzle(s) is typically in the range of from 1 to 40 bar, preferably 2 to 15 bar, more preferably 3 to 7 bar, most preferably 3 to 4 bar. Preferably, the ratio of the volume of gas ($Q_g$) to the volume of liquid ($Q_l$) passing through the venturi nozzle(s) is in the range 0.5:1 to 10:1, more preferably 1:1 to 5:1, most preferably 1:1 to 2.5:1, for example, 1:1 to 1.5:1 (where the ratio of the volume of gas ($Q_g$) to the volume of liquid ($Q_l$) is determined at the desired reaction temperature and pressure).

Where the injector mixing nozzle(s) is executed as a gas blast or gas assist nozzle(s), the pressure drop of gas over the nozzle(s) is preferably in the range 3 to 100 bar and the pressure drop of suspension over the nozzle(s) is preferably in the range of from 1 to 40 bar, preferably 4 to 15, most preferably 4 to 7. Preferably, the ratio of the volume of gas ($Q_g$) to the volume of liquid ($Q_l$) passing through the gas blast or gas assist nozzle(s) is in the range 0.5:1 to 50:1, preferably 1:1 to 10:1 (where the ratio of the volume of gas ($Q_g$) to the volume of liquid ($Q_l$) is determined at the desired reaction temperature and pressure).

Suitably, the shearing forces exerted on the suspension in the high shear mixing zone(s) are sufficiently high that the synthesis gas is broken down into gas bubbles having diameters in the range of from 1 $\mu$m to 10 mm, preferably from 30 $\mu$m to 3000 $\mu$m, more preferably from 30 $\mu$m to 300 $\mu$m.

Without wishing to be bound by any theory, it is believed that the irregularly shaped gas voids are transient in that they are coalescing and fragmenting on a time scale of up to 500 ms, for example, over a 10 to 50 ms time scale. The irregularly shaped gas voids have a wide size distribution with smaller gas voids having an average diameter of 1 to 2 mm and larger gas voids having an average diameter of 10 to 15 mm.

The high shear mixing zone(s) can be placed at any position on the walls of the reactor vessel (for example, at the top, bottom or side walls of a tank reactor). Where the reactor vessel is a tank reactor the suspension is preferably withdrawn from the reactor vessel and is at least in part recycled to a high shear mixing zone(s) through an external conduit having a first end in communication with an outlet for suspension in the reactor vessel and a second end in communication with an inlet of the high shear mixing zone. The suspension may be recycled to the high shear mixing zone(s) via a mechanical pumping means, for example, a slurry pump, positioned in the external conduit. Owing to the exothermic nature of the Fischer-Tropsch synthesis reaction, the suspension recycle stream is preferably cooled by means of a heat exchanger positioned on the external conduit (external heat exchanger). Additional cooling may be provided by means of an internal heat exchanger comprising cooling coils, tubes or plates positioned within the suspension in the tank reactor.

Suitably, the ratio of the volume of the external conduit (excluding the volume of any external heat exchanger) to the volume of the tank reactor is in the range of 0.005:1 to 0.2:1.

Where the reactor vessel is a tubular loop reactor, a single high shear mixing zone, in particular an injector-mixing nozzle may discharge the mixture comprising synthesis gas and the suspension into the tubular loop reactor. Alternatively, a series of injector-mixing nozzles may be arranged around the tubular loop reactor. If necessary, suspension may be circulated around the tubular loop reactor via at least one mechanical pumping means e.g. a paddle or propeller. An external heat exchanger may be disposed along at least part of the tubular loop reactor, preferably along substantially the entire length of the tubular loop reactor thereby providing temperature control. It is also envisaged that an internal heat exchanger, for example cooling coils, tubes or plates may be located in at least part of the tubular loop reactor.

Preferably the Fischer-Tropsch reactor system is operated with a gas hourly space velocity (GHSV) in the range 100 to 40000 $h^{-1}$, more preferably 1000 to 30000 $h^{-1}$, most preferably 2000 to 15000, for example 4000 to 10000 $h^{-1}$ at normal temperature and pressure (NTP) based on the feed volume of synthesis gas at NTP.

Usually the suspension discharged into the reactor vessel from the high shear mixing zone(s) comprises less than 40% wt of mixed catalyst particles, more preferably 10 to 30% wt of mixed catalyst particles, most preferably 10 to 20% wt of mixed catalyst particles.

The Fischer-Tropsch reaction is preferably carried out at a temperature of 180–280° C., more preferably 190–240° C.

The process of the invention is preferably carried out at a pressure of 5–50 bar, more preferably 15–35 bar, generally 20–30 bar.

The synthesis gas may be prepared using any of the processes known in the art including partial oxidation of hydrocarbons, steam reforming, gas heated reforming, microchannel reforming (as described in, for example, U.S. Pat. No. 6,284,217 which is herein incorporated by reference), plasma reforming, autothermal reforming and any combination thereof. A discussion of these synthesis gas production technologies is provided in "Hydrocarbon Processing" V78, N. 4, 87–90, 92–93 (April 1999) and "Petrole et Techniques", N. 415, 86–93 (July–August 1998). It is also envisaged that the synthesis gas may be obtained by catalytic partial oxidation of hydrocarbons in a microstructured reactor as exemplified in "IMRET 3: Proceedings of the Third International Conference on Microreaction Technology", Editor W Ehrfeld, Springer Verlag, 1999, pages 187–196. Alternatively, the synthesis gas may be obtained by short contact time catalytic partial oxidation of hydrocarbonaceous feedstocks as described in EP 0303438. Preferably, the synthesis gas is obtained via a "Compact Reformer" process as described in "Hydrocarbon Engineering", 2000, 5, (5), 67–69; "Hydrocarbon Processing", 79/9, 34 (September 2000); "Today's Refinery", 15/8, 9 (August 2000); WO 99/02254; and WO 200023689.

Preferably, a stream comprising a coolant liquid, e.g. a low boiling hydrocarbon(s) (for example, methanol, dimethyl ether, pentanes, hexanes or hexenes) may be introduced into the high shear mixing zone(s) and/or the reactor vessel (tank or tubular loop reactor) as described in WO 0138269 (PCT patent application number GB 0004444).

Where the reactor vessel is a tank reactor the coolant liquid may also be introduced into the external conduit.

Preferably, the ratio of hydrogen to carbon monoxide in the synthesis gas is in the range of 20:1 to 0.1:1 by volume and especially in the range of 5:1 to 1:1 by volume e.g. 2:1 by volume.

Preferably, the hydrocarbons produced by contact of the synthesis gas with the Fischer-Tropsch catalyst comprise a mixture of hydrocarbons having a chain length of greater than 5 carbon atoms. Suitably, the hydrocarbons comprise a mixture of hydrocarbons having chain lengths of from 5 to about 90 carbon atoms. Preferably, a major amount, for example, greater than 60% by weight, of the hydrocarbons have chain lengths of from 5 to 30 carbon atoms.

The catalyst employed in the process of the present invention comprises any particulate catalyst known to be active in Fischer-Tropsch synthesis.

Fischer-Tropsch catalysts usually comprise supported or unsupported Group VIII metals. Of these iron, cobalt and ruthenium are preferred, particularly iron and cobalt, most particularly cobalt.

A preferred catalyst is supported on an inorganic oxide, preferably a refractory inorganic oxide. Preferred supports include silica, alumina, silica-alumina, the Group IVB oxides, titania (primarily in the rutile form) and most preferably zinc oxide. The supports generally have a surface area of less than about 100 $m^2/g$, suitably less than 50 $m^2/g$, for example, less than 25 $m^2/g$ or about 5 $m^2/g$.

The catalytic metal is present in catalytically active amounts usually about 1–100 wt %, the upper limit being attained in the case of metal based catalysts, preferably 2–40 wt %. Promoters may be added to the catalyst and are well known in the Fischer-Tropsch catalyst art. Promoters can include ruthenium, platinum or palladium (when not the primary catalyst metal), aluminium, rhenium, hafnium, cerium, lanthanum and zirconium, and are usually present in amounts less than the primary catalytic metal (except for ruthenium which may be present in coequal amounts), but the promoter:metal ratio should be at least 1:10. Preferred promoters are rhenium and hafnium.

The particulate Fischer-Tropsch catalyst may have an average particle size in the range 5 to 500 microns, preferably 5 to 100 microns, for example, in the range 5 to 40 microns.

The products of the Fischer-Tropsch synthesis reaction may be separated from the particulate catalyst, purified and optionally hydrocracked as described in WO 0138269 (PCT patent application number GB 0004444).

BRIEF DESCRIPTION OF THE DRAWING

The invention will now be described in more detail with reference to the accompanying FIGURE which illustrates a reactor system for carrying out the process of the invention.

DETAILED DESCRIPTION OF PREFERRED EMBODIMENTS

Figure 1:
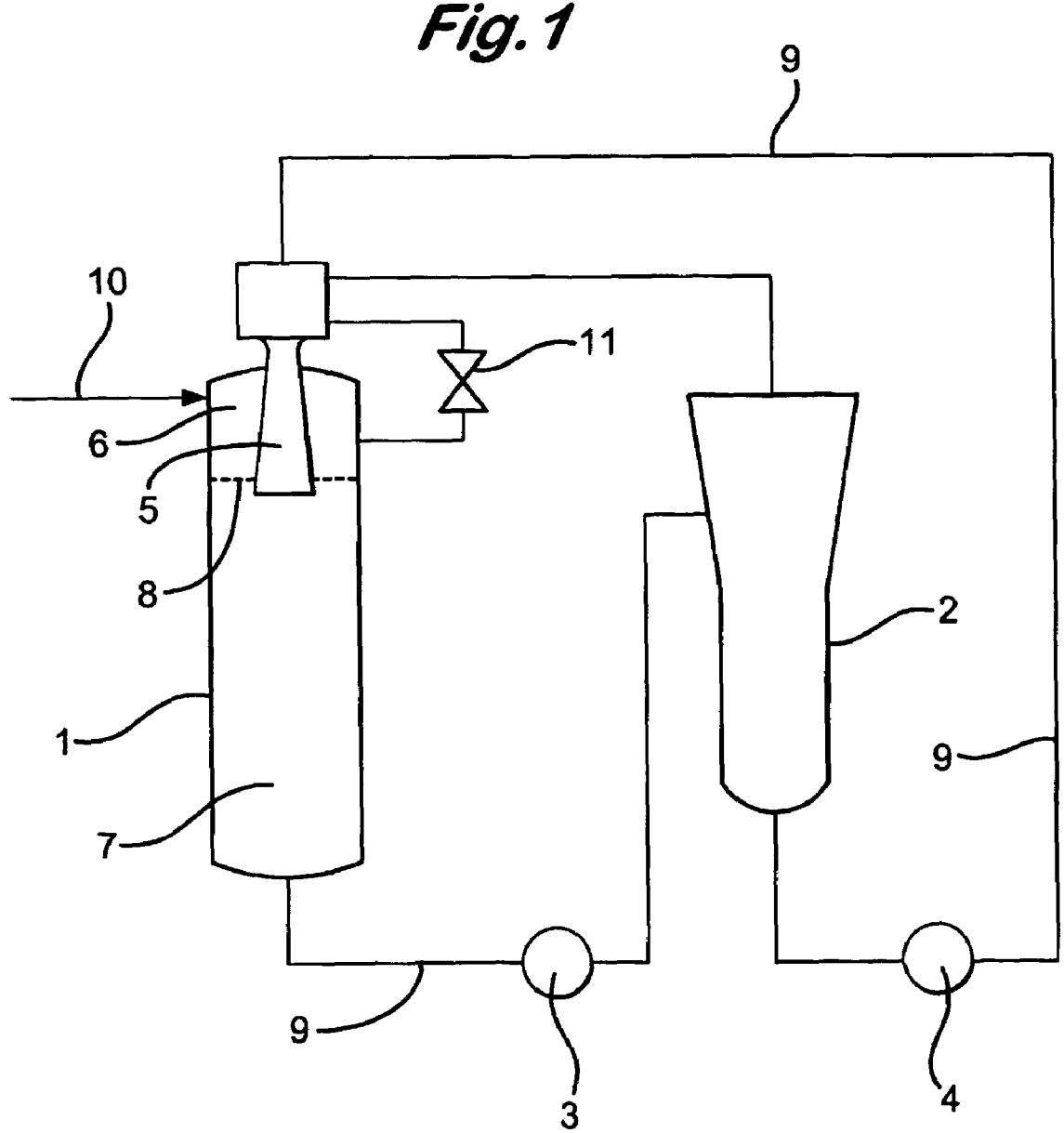

FIG. 1 illustrates a reactor system comprising a tank reactor vessel (1), a gas liquid separator (2), a first pump (3) and a second pump (4). A venturi nozzle (5) is located in the upper region of the tank reactor vessel (1).

A gas cap (6) is present in the upper part of the reactor vessel (1), the lower part of which contains a suspension (7) of particulate catalyst suspended in liquid higher hydrocarbons. A dotted line (8) denotes the upper level of the suspension (7) in the reactor vessel (1). Suspension (7) is recycled to the venturi nozzle (5) via an external conduit (9).

Through one or more openings in the side walls of the venturi nozzle (5) a gaseous phase comprising synthesis gas is drawn into the nozzle (5) from the gas cap (6). The gas flow to the nozzle (5) can be shut off using flow valve (11). Fresh synthesis gas is introduced into the gas cap (6) via a line (10).

Via a lower outlet opening of the nozzle (5) the suspension having synthesis gas entrained therein is discharged into the reactor vessel (1) below the level (8) of the suspension (7). Unconverted gaseous reactants then separate into the gas cap (6).

Suspension (7) is withdrawn from the bottom of the vessel (1) and at least a portion of the suspension is recycled to the nozzle (5) via the first pump (3), the gas liquid separator (2), the second pump (4) and the external conduit (9).

EXAMPLES

The invention will now be illustrated using the following examples.

Example 1

A suspension of aluminium oxide catalyst (15% w/w) in 700 liters of tetradecene was charged to a reactor system comprising a tank reactor vessel (straight length 4500 mm, diameter 420 mm) and an external conduit. A gas liquid separator, a first and a second three-phase centrifugal pump were positioned on the external conduit (the first centrifugal pump (P1080) located upstream and the second centrifugal pump (P1280) located downstream of the gas liquid separator). A 24 mm venturi nozzle was located in the upper region of the tank reactor vessel. Tetradecene was used as a mimic for the Fischer-Tropsch wax, having similar physical properties at 30° C. as Fischer-Tropsch wax at a temperature of between 200–250° C. Nitrogen was used as the gas feed to the venturi nozzle and suspension having gas bubbles and irregularly shaped gas voids dispersed therein was discharged from the nozzle below the level of suspension in the tank reactor vessel. The reactor system was pressurised to 30 bar using nitrogen and the suspension was pumped around the external conduit using the three-phase centrifugal pumps. The reactor system was then allowed to reach steady state.

A series of measurements were taken around the reactor system before and after the gas flow had been shut off. The gas flow stopped to the venturi nozzle by closing the gas flow valve FV1092. After 10 mins the gas flow was restarted by opening gas flow valve FV1092. The results shown in table 1 indicate that the measurements before and after the gas flow was stopped were similar and this illustrates that the gas can be switched off and on with the pumps running and that this does not subsequently effect the operation of the reactor system.

TABLE 1

| | Before gas shut off | With gas shut off | After gas flow resumed |
|---|---|---|---|
| gas/liquid ratio | 1.25:1 v/v | 0:1 v/v | 1.25:1 v/v |
| P1080 % | 87 | 87 | 87 |
| Pressure drop across P1080 (bar) | 3.05 | 3.05 | 3.05 |
| P1280 % | 100 | 97 | 96 |
| Pressure drop across P1280 bar | 4.42 | 4.14 | 4.00 |
| Pressure in gas liquid separator (bar) | 20.75 | 20.78 | 20.87 |
| Pressure in external conduit downstream of P1280 (bar) | 25.17 | 24.92 | 24.87 |
| Pressure drop in venturi nozzle suction chamber (bar) | 0.34 | 0.81 | 0.31 |
| FV1092 % (position of flow valve on gas recycle line from the reactor headspace to the venturi nozzle) | 65 | 0 | 65 |
| Flow rate of gaseous recycle stream from reactor headspace to the venturi nozzle (kg/hr) | 1750 | 0 | 1660 |
| Flow rate of gaseous recycle stream from the gas liquid separator to the venturi nozzle (kg/hr) | 0 | 0 | 0 |
| Pressure in the tank reactor vessel (bar) | 22.39 | 22.52 | 22.33 |
| Pressure drop of suspension across venturi nozzle (bar) | 2.36 | 1.95 | 2.23 |
| Flow meter reading tonnes/hr | 40 | 40 | 40 |
| Level in the reactor (mm above bottom flange) | 3000 | 2700 | 3000 |

Example 2

A suspension of aluminium oxide catalyst (7% w/w) in 700 liters of tetradecene was charged to a reactor system and Example 1 was repeated. The three phase centrifugal pumps were shut down which caused the suspension and the gas flow to step. After 10 mins the pumps were restarted. The measurements taken around the reactor system are shown in table 2 stop. After 10 mins the pumps were restarted. The measurements taken around the reactor system are shown in table 2

TABLE 2

| | Before pumps shut down | After pumps restarted |
|---|---|---|
| gas/liquid ratio | 2.98:1 v/v | 2.98:1 v/v |
| P1080 % | 80 | 80 |
| Pressure drop across P1080 (bar) | 2.41 | 2.41 |

TABLE 2-continued

| | Before pumps shut down | After pumps restarted |
|---|---|---|
| P1280 % | 86.00 | 86.14 |
| Pressure drop across P1280 bar | 3.05 | 2.95 |
| Pressure in gas liquid separator (bar) | 22.22 | 22.32 |
| Pressure in external conduit downstream of P1280 (bar) | 25.27 | 25.27 |
| Pressure drop in venturi nozzle suction chamber (bar) | 0.23 | 0.23 |
| FV1092 % (position of flow valve on gas recycle line from the reactor headspace to the venturi nozzle) | 75 | 75 |
| Flow rate of gaseous recycle stream from reactor headspace to the venturi nozzle (kg/hr) | 2775 | 2784 |
| Flow rate of gaseous recycle stream from the gas liquid separator to the venturi nozzle (kg/hr) | 10 | 0 |
| Pressure in the tank reactor vessel (bar) | 22.27 | 22.26 |
| Pressure drop of suspension across venturi nozzle (bar) | 2.6 | 2.59 |
| Flow meter reading tonnes/hr | 28 | 28 |
| Level in the reactor (mm above bottom flange) | 3000 | 3000 |

Example 3

Example 2 was repeated using a suspension of aluminium oxide catalyst (15% w/w) in 700 liters of tetradecene. The results are shown in table 3.

TABLE 3

| | Before pumps shut down | After pumps restarted |
|---|---|---|
| gas/liquid ratio | 2.91:1 v/v | 2.88:1 v/v |
| P1080 % | 80 | 80 |
| Pressure drop across P1080 (bar) | 2.52 | 2.50 |
| P1280 % | 86 | 86 |
| Pressure drop across P1280 bar | 3.17 | 3.13 |
| Pressure in gas liquid separator (bar) | 22.39 | 22.40 |
| Pressure in external conduit downstream of P1280 (bar) | 25.56 | 25.53 |
| Pressure drop in venturi nozzle suction chamber (bar) | 0.24 | 0.23 |
| FV1092 % (position of flow valve on gas recycle line from the reactor headspace to the venturi nozzle) | 75 | 75 |
| Flow rate of gaseous recycle stream from reactor headspace to the venturi nozzle (kg/hr) | 2790 | 2758 |
| Flow rate of gaseous recycle stream from the gas liquid separator to the venturi nozzle (kg/hr) | 0 | 0 |
| Pressure in the tank reactor vessel (bar) | 22.43 | 22.42 |
| Pressure drop of suspension across venturi nozzle (bar) | 2.75 | 2.74 |
| Flow meter reading tonnes/hr | 29 | 29 |
| Level in the reactor (mm above bottom flange) | 3000 | 3000 |

Examples 2 and 3 show that the three phase centrifugal pumps can be shut down and restarted and that this does not subsequently effect the operation of the reactor system.

The invention claimed is:

1. A method of starting up a Fischer-Tropsch reaction in a system comprising at least one high shear mixing zone and a reactor vessel, which method comprises
    a) passing a suspension of a particulate Fischer-Tropsch catalyst in a liquid medium through the high shear mixing zone(s) into the reactor vessel and recycling at least a portion of the suspension to the high shear mixing zone(s) in the substantial absence of a gaseous reactant feed stream comprising synthesis gas;
    b) increasing the temperature and/or pressure within the reactor vessel until a threshold temperature and/or pressure is reached and subsequently introducing a gaseous reactant stream comprising synthesis gas into the high shear mixing zone(s) where the gaseous reactant stream is mixed with the suspension;
    c) discharging a mixture comprising synthesis gas and the suspension from the high shear mixing zone(s) into the reactor vessel;
    d) converting the synthesis gas to liquid hydrocarbons in the reactor vessel to form a product suspension comprising the particulate Fischer-Tropsh catalyst suspended in the liquid medium and liquid hydrocarbons; and
    e) recycling at least a portion of the product suspension to the high shear mixing zone(s).

2. A method according to claim 1 wherein the suspension of a particulate Fischer-Tropsch catalyst in a liquid medium of step (a) and the product suspension of step (b) are recycled using a mechanical pumping means.

3. A method according to claim 1 wherein the suspension is recycled in step (a) around the system in an inert atmosphere.

4. A method according to claim 1 wherein the reactor vessel is increased to a threshold temperature in the range of 180–280° C.

5. A method according to claim 1 wherein the reactor vessel is increased to a threshold pressure of 5–50 bar.

6. A method of shutting down a Fischer-Tropsch reaction in a system comprising at least one high shear mixing zone and a reactor vessel, which method comprises
    a) maintaining a recycle of at least a portion of the product suspension from the reactor vessel to the high shear mixing zone(s); and
    b) ceasing introducing the gaseous reactant stream comprising synthesis into the high shear mixing zone(s).

7. A method according to claim 6 wherein at least a portion of the product suspension is recycled using a mechanical pumping means.

8. A method for maintaining a Fischer-Tropsch catalyst in suspension in a liquid medium and liquid hydrocarbon products in a system comprising at least one high shear mixing zone and a reactor vessel, which method comprises:
    a) maintaining a recycle of at least a portion of the product suspension from the reactor vessel to the high shear mixing zone(s); and
    b) reducing the rate at which the gaseous reactant stream comprising synthesis gas is introduced to the high shear mixing zone(s) or interrupting the feed of the gaseous reactant stream comprising synthesis into the high shear mixing zone(s).

9. A method according to claim 8 wherein at least a portion of the product suspension is recycled using a mechanical pumping means.

10. A method according to claim 1 wherein the reactor vessel is a tank reactor or a tubular loop reactor.

11. A method according to claim 1 wherein the high shear mixing zone(s) project through the walls of the reactor vessel such that the high shear mixing zone(s) discharges its contents into the reactor vessel.

12. A method according to claim 1 wherein the reactor system comprises up to 250 high shear mixing zones.

13. A method according to claim 1 wherein the high shear mixing zones comprises an injector-mixing nozzle(s).

14. A method according to claim 13 wherein the injector mixing nozzle(s) is a venturi nozzle(s) or a gas blast nozzle(s).

15. A method according to claim 1 wherein the Fischer-Tropsch reaction is carried out at a temperature of 180–280° C. and at a pressure of 5–50 bar.

16. A method according to claim 1 wherein the ratio of hydrogen to carbon monoxide in the synthesis gas is in the range of 20:1 to 0.1:1 by volume.

17. A method according to claim 1 wherein the Fischer-Tropsch catalyst is cobalt supported on zinc oxide.

* * * * *